UNITED STATES PATENT OFFICE 2,387,933

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application November 6, 1941,
Serial No. 418,066

9 Claims. (Cl. 260—78)

This invention relates to a new class of unsaturated esters having unusual and valuable properties as hereinafter described. This invention is a continuation-in-part of our application for Letters Patent Serial No. 361,280, filed October 15, 1940, and Serial No. 403,703, filed July 23, 1941.

The new unsaturated compounds are the carbonate esters of unsaturated alcohols which esters have at least three ester linkages in a molecule. By "ester linkage" we mean a linking oxygen atom derived by reaction of an alcohol with a compound having an hydroxyl group adjacent a carbonyl radical. Thus, a carbonate group

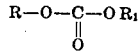

contains two ester linkages.

Common chemical nomenclature and terminology have been used when possible. Frequently, however, chemical expressions may have several accepted meanings. It is therefore necessary to define the scope of these ambiguous expressions which must be necessarily used to describe the invention.

The expression "polyacidic compound" has been used herein in the generic sense to include all compounds having two or more acid groups (i. e., acidic OH or —COOH) and which do not contain a free alcohol type of hydroxyl group. The expression is intended to include simple polybasic inorganic acids such as boric, silicic, carbonic, sulphuric, or phosphoric acids, the simple polycarboxylic acids such as oxalic, adipic, succinic, maleic, fumaric, tricarballylic, phthalic, diphenyldicarboxylic or naphthalic acids, the simple heterocyclic acids such as quinolinic, cinchomeronic, ethylene oxide-α,α-dicarboxylic or cotarinic acids, or the simple ether acids such as diglycolic, dilactic, and the corresponding thioether acids or methoxysuccinic acids, and the more complex ester acids which contain esters such as glycolyl acid malonate

HOOC—CH$_2$—O—CO—COOH ethylene bis (acid sulphate)

HO—CO$_2$—O—C$_2$H$_4$—O—SO$_2$—OH the acid carbonate of lactyl lactic acid

HOOC-CH(CH$_3$)-O-CO-CH(CH$_3$)-O-CO-OH diglycolyl oxalate

HOOC—CH$_2$—O—CO—CO—O—CH$_2$—COOH etc.

The expression "polyhydroxy compounds" is intended to be generic to all compounds having two or more hydroxyl groups which do not have any free acid groups. The hydroxy groups must obviously not be attached directly to carbonyl groups. The expression includes the simple polyhydroxy alcohols such as ethylene glycol, propylene glycol, butylene glycol, trimethylene glycol, pentamethylene glycol, glycerine, methylglycerol, erythritol, or pentaerythritol; the sugars such as glucose, lactose, sucrose, or maltose; the polymers of polyhydroxy alcohols such as di-, tri-, and tetraethylene glycol, di-, tri-, and tetrapropylene glycol, the polybutylene glycols, polyglycerols, etc.; the cyclic polyhydroxy compounds such as pyrogallol, hydroquinone, 2,5-bis (hydroxymethyl) furan, 3,5 - dihydroxycoumarone, dioxanediols, or p,p-dihydroxy-diphenyl ether, and the polyhydroxy esters such as ethylene dilactate

CH$_3$—CHOH—CO$_2$—C$_2$H$_4$—CO$_2$—CHOH—CH$_3$ bis (hydroxyethyl) carbonate (HO—C$_2$H$_4$)$_2$—CO$_3$, glycol monoglycolate

HO—C$_2$H$_4$—O—CO—CH$_2$OH or diethylene glycol bis (hydroxyethyl carbonate) (HOC$_2$H$_4$—CO$_3$—C$_2$H$_4$)$_2$O.

The expression "hydroxy acid" is used in the broad sense to include all compounds having both carboxyl groups and alcoholic hydroxyl groups. The generic expression includes aliphatic hydroxy acids such as citric, hydroxy butyric, tartaric, leucinic, saccharic, hydrocrylic, malic, ricinoleic, acetonic, glyceric, lactic and glycolic acids, the aromatic hydroxy acids such as salicylic, gallic, resorcylic, phloritic, and coumaric acids, and the heterocyclic hydroxy acids such as berberonic, alpha-furylglycolic and 3-hydroxycoumarone carboxylic (2) acid

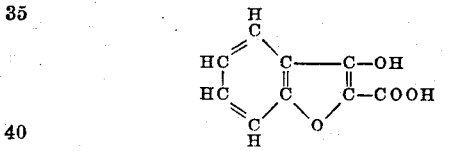

The generic expression hydroxy acids also includes the ester hydroxy acids including theoretical acids such as hydroxyethyl carbonate HO—C$_2$H$_4$—CO$_2$—OH, lactyl lactic acids

CH$_3$—CHOH—CO$_2$—CH(CH$_3$)COOH and 2-(hydroxyethyl) ethyl carboxymethyl carbonate

HO—C$_2$H$_4$—O—C$_2$H$_4$—O—CO$_2$—CH$_2$COOH or glycol monoacid sulphate

HO—C$_2$H$_4$—O—SO$_2$—OH

It is necessary to differentiate between compounds which contain ester linkages between the reactive groups of the compound which separate the unsaturated alcohol radicals of the ultimate esters and those which do not. Accordingly, the expression "polyacidic ester" has been used herein to refer to the class of polyacidic compounds which contain at least one ester linkage between a pair of carboxyl groups. They, of course, contain at least two reactive acidic groups and may not contain reactive alcoholic hydroxy groups. The expressions "simple polyacid" or "simple polybasic acid" are used to denote compounds of more simple structure having no ester linkages in the molecules between the acid groups. Similarly, the expression "polyhydroxy ester" includes the compounds having at least two alcoholic hydroxy groups and no reactive acidic groups but which also contain at least one ester linkage between a pair of hydroxyl groups. The simple polyhydroxy compounds are acid-free compounds in which the hydroxyl groups are not separated by an ester linkage and the simple hydroxy acids are compounds containing acid and hydroxyl groups which are not separated by an ester linkage. These simple compounds, may, however, contain more stable, less easily hydrolyzed groups such as ether or thioether groups. The compounds herein contemplated in some cases may also contain tertiary amino groups although it is preferred that the composition be nitrogen free since such products possess greater stability and yield polymers which are more stable and have other characteristics which render them more desirable than nitrogeneous compounds.

For example, the compound derived by reacting allyl lactate with phosgene has the following probable structure:

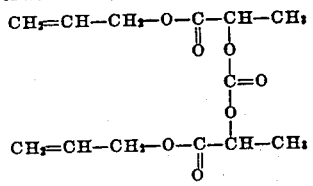

and may be considered to be an allyl ester of the polyacidic compound

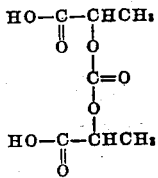

However, since this acid contains ester groups between the acid groups, it is not a simple polyacidic compound but is a polyacidic ester. Additionally, however, the above allyl ester may be regarded as a partial ester of the simple polyacid carbonic acid and allyl alcohol. Oxalic, malonic, or diglycolic acids are simple polyacidic compounds. Likewise, glycol, diethylene glycol, or glycerol, etc., are simple polyhydroxy compounds and lactic, ricinoleic and glycolic acid are simple hydroxy acids.

It will be apparent that many of the acids, hydroxy compounds, and hydroxy acids contemplated within the above definitions may not exist as such in the free state and, consequently, may be theoretical compounds. Since their esters may be prepared, however, it is often convenient to regard such esters as esters of such theoretical acids.

The unsaturated radicals may be derived from alcohols having from 2 to 10 carbon atoms and which have an unsaturated linkage in an aliphatic chain. Preferably alcohol radicals are those which may be regarded as derived from alcohols having up to 5 carbon atoms, for example, allyl, isopropenyl, or other propenyl alcohol; the butenyl alcohols such as methallyl, crotyl, isocrotyl, or methyvinylcarbinol; the various pentenols such as alpha or beta ethyl-allyl, tiglyl, angelyl alcohols or methyl-allyl-carbinols, dienols such as butadienyl alcohol or acetylenic alcohols such as propargyl alcohol, etc. Although the short chain alcohols are preferable, other unsaturated alcohols having 10 or less carbon atoms may be used, for example, linallyl alcohol, allylethyl car-carbinol, diallyl-carbinol, isopropyl-ethynyl-carbinol, and the araliphatic alcohols such as cinnamyl or phenylpropargyl alcohols. The halogen substituted products of the above alcohols are also useful such as 2-chlorallyl, chlorocrotyl, or 2-bromoallyl alcohols. Vinyl esters may be prepared in cases particularly where the vinyl group is linked to a carboxylic group. These esters may be prepared by reaction of the corresponding acid with acetylene or by dehydrohalogenation of β-bromoethyl esters.

The new esters contain at least three ester linkages, two of which are derived from carbonic acid and thus are comparatively complex esters. In general, the simple esters having no more than six ester linkages in a single chain are found preferable. However, esters containing up to 10 ester linkages in a chain are contemplated. Many of these esters have been described in our copending applications Serial Nos. 361,280, filed October 15, 1940, 392,102, filed May 6, 1941, and 403,703, filed July 23, 1941.

A large variety of carbonate esters may be produced. In accordance with one modification, the carbonate group may be attached to the unsaturated alcohol and in such a case the esters may be regarded as esters of (a) a partial ester of carbonic acid and an unsaturated alcohol containing at least three carbon atoms and (b) another hydroxy compound. Such hydroxy compounds may be a polyhydroxy compound or an hydroxy acid including the simple polyhydroxy compounds and hydroxy acids and also the more complex polyhydroxy esters and hydroxy acid esters.

For example, desirable esters may be secured from polyhydroxy compounds by esterifying one or more groups of the polyhydroxy compound with the partial ester. Thus, allyl or other unsaturated chloroformate may be reacted with a polyhydroxy compound to form mono or polyesters. This reaction may be conducted at a suitable temperature, for example, 0 to 20° C. in the presence of pyridine or other tertiary cyclic amine, or a carbonate, hydroxide, or oxide of sodium, potassium, calcium, or other electronegative metal. Glycol, diethylene glycol, castor oil, or other of the above mentioned polyhydroxy compounds may be reacted with allyl or other unsaturated chloroformate to form the compounds herein contemplated. In many cases the compounds also may be prepared by reaction of the polychloroformates of the polyhydroxy compounds such as glycol dichloroformate, diethylene glycol dichloroformate, etc., with the desired unsaturated alcohol also in the presence of an alkaline agent.

In similar manner salts or esters of hydroxy acids may be prepared. For example, a saturated or unsaturated ester of lactic acid or of lactyl lactic acid such as methyl, ethyl, propyl, butyl, lauryl, stearyl, vinyl, allyl, methallyl, 2-chlorallyl, linallyl, or propargyl lactate or the corresponding esters of other hydroxy acid may be reacted with allyl or other unsaturated chloroformate to form an unsaturated carbonic ester. Many of these esters have the following general structure:

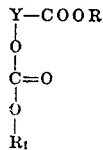

Where R and $R_1$ are unsaturated radicals and Y is an organic radical such as an hydrocarbon or hydrogen substituted hydrocarbon radical in which the oxygen is linked directly to a carbon atom. The polyhydric alcohol esters of these acids including glycol dilactate, glycol monolactate, glycol disalicylate, glycerol monosalicylate, glycol glycollate, castor oil, etc., may also be so treated to form mono and/or polyesters of the partial carbonic ester. For example, the following compound or its homologues may be prepared:

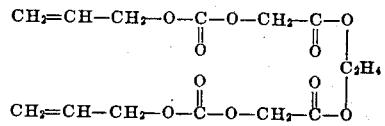

The above esters may also be prepared from the chloroformate of the corresponding esterified hydroxy acid such as the chloroformate of allyl lactate.

In addition, other complex esters of this type may be obtained by reaction of a partial ester of a simple polyhydroxy compound, and a simple polybasic acid such as bis (β-hydroxy ethyl) phthalate, or succinate, or the corresponding hydroxy propyl, hydroxy butyl esters, etc. with an unsaturated chloroformate to form a mono or polyester such as

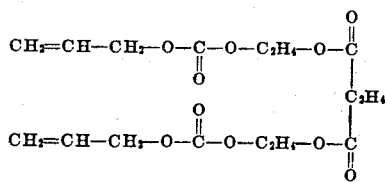

or the homologues thereof. Many symmetrical esters of this type have the following general structure:

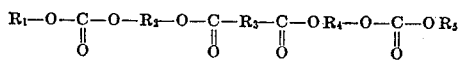

where $R_1$ and $R_5$ are unsaturated, $R_2$ and $R_4$ are derived from a polyhydroxy compound glycol, diethylene glycol, propylene glycol, glycerol, etc., and the radical

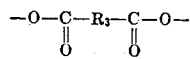

is derived from a polycarboxylic acid.

In accordance with a further modification, the carbonate group may be located in an internal portion of the chain and the unsaturated alcohol radical linked to an acid group other than carbonic acid. In such a case the carbonate group serves to link a pair of unsaturated alcohol esters. This is particularly advantageous for the production of polyunsaturated esters which may be polymerized as herinafter described.

One type of carbonate esters under this modification may be prepared by reacting an unsaturated alcohol ester containing a free hydroxyl group with phosgene, in the presence of pyridine or other alkaline reagent. These esters may be regarded as symmetrical with respect to the carbonic acid group. In accordance with this modification of the invention, phosgene may be reacted with unsaturated alcohol esters of simple hydroxy acids having a single hydroxyl group such as allyl lactate, allyl salicylate, allyl glycolate, diallyl malate, diallyl tartronate, triallyl citrate, allyl ricinoleate, etc., and the corresponding methallyl, vinyl, crotyl, chlorallyl, etc. derivatives. Phosgene may also be reacted with monohydroxy esters of (a) a simple polyhydroxy compound and (b) a partial ester of a simple polybasic acid and unsaturated alcohol, such as glycol mono (allyl carbonate), glycol mono (allyl maleate), glycol mono (allyl succinate), glycol mono (allyl adipate), etc., and the corresponding glycerol, diethylene glycol, dipropylene glycol, resorcinol, trimethylene glycol, etc., derivatives, and the corresponding methallyl, vinyl, crotyl, chlorallyl, etc., esters. Phosgene may also be reacted with an unsaturated alcohol ester of a monohydroxy ester comprised of two or more molecules of a simple hydroxy acid, such as allyl lactyl lactate, allyl glycolyl lactate, allyl salicylyl lactate, and the corresponding glycolates, salicylates, hydroxybutyrates, etc., and the corresponding methallyl, chlorallyl, vinyl, crotyl, etc., esters.

Monounsaturated carbonate esters may be prepared by treating unsaturated monohydroxy esters with saturated chloroformates such as methyl or ethyl or butyl chloroformate. Suitable unsaturated monohydroxy esters are allyl lactate, allyl salicylate, diallyl malate, triallyl citrate, allyl ricinoleate, etc., and the corresponding methallyl, chlorallyl, crotyl, etc., derivatives; glycol monoallyl maleate, glycol monoallyl succinate, glycol monoallyl phthalate, etc., and the corresponding glycerol, diethylene glycol, propylene glycol, etc., derivatives and the corresponding methallyl, vinyl, crotyl, tiglyl, etc. esters; allyl glycolyl-lactate, allyl lactyl lactate, diallyl lactyl malate, allyl salicylyl lactate and the corresponding methalyl, chlorallyl, vinyl, crotyl, etc., esters. The production of these esters is not confined to treatment of the hydroxy ester with an unsaturated or saturated chloroformate since the above hydroxy esters may be treated with phosgene at suitable temperatures, preferably below about 25° C. to form a chloroformate

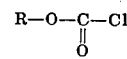

which may be used for the production of the carbonate esters above described.

A further type of ester may be prepared by reacting a polychloroformate such as ethylene glycol dichloroformate, diethylene glycol dichloroformate, etc., with an unsaturated alcohol ester of an hydroxy acid such as allyl lactate or other ester of a mono hydroxy acid. By this means compounds such as the following may be secured:

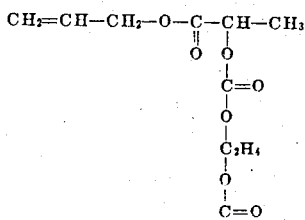
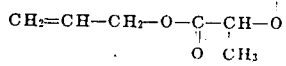

for the production of the esters herein contemplated.

The reactions may be conducted in the presence of a diluent such as benzene, chloroform, ether, carbon tetrachloride, or water. Such a diluent is quite desirable when the final ester or any of the intermediate products are solids or viscous liquids.

The new unsaturated carbonates are generally non-resinous compounds having distinct boiling and melting points and are usually capable of separation in substantially pure state. Frequently, the impurities are side reaction products which are colorless and transparent esters. In such cases removal of such impurities may be unnecessary where they do not produce any detrimental effect in the use to which the ester is put. The new compounds are usually liquids at room temperature but some, however, are solids. The new unsaturated compounds are usually miscible in solvents such as benzene, toluene, chloroform, diethyl ether, carbon tetrachloride and petroleum ether. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

An important use of the new compounds involves their polymerizability in the presence of heat, light, or catalysts such as oxygen, ozone, or organic peroxides such as lauroyl peroxide, benzoyl and acetone peroxides, to yield solid or liquid compositions of widely differing physical properties. The polymerized products will vary in properties depending on the structure of the ester and upon the degree of polymerization.

The monounsaturated esters containing but a single polymerizable group generally polymerize to a fusible or thermoplastic polymer. The polyunsaturated esters which contain at least two radicals derived from unsaturated alcohol are capable of polymerization to intermediate stages and finally to a substantially infusible and insoluble form. The completely polymerized polyunsaturated compounds are substantially unaffected by acids, alkalies, water, and organic solvents. Intermediate polymers derived from the polyunsaturated esters having a wide range of properties may be secured by incomplete polymerization. The polymers thus obtained are transparent and colorless, although they may at times have a slightly yellowish cast, especially when polymerized completely. Many of the new products obtained by polymerization are generally tougher and more resistant to shattering than are the unsaturated alcohol esters of polybasic acids.

Upon the initial polymerization of the polyunsaturated esters in liquid monomeric state or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing substantial portions of polymers which are insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers of the polyunsaturated esters may be cast polymerized directly to the insoluble, infusible state. This procedure is subject to certain inherent difficulties due to the reduction in volume during the polymerization. The loss of volume or shrinkage causes strains to be established in the hardening gel which frequently result in fractures as the final hard form is attained. It has been discovered that these difficulties may be avoided by releasing the strains established in the gel. This may be done by permitting the strains to be relieved before the polymerization is complete or at least by conducting the polymerization under conditions which permit gradual release of these strains. For example, the polymerization may be conducted in a simple mold until a soft firm gel has formed. At this point the polymer may be freed from the mold to which it adheres strongly. When released the polymer contracts substantially thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide temperatures of 65 to 80° C. are suitable while for acetone peroxide temperatures of 140–150° C. may be used. The soft sheet of gel is then freed of the mold and in accordance with one modification the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air or other material which inhibits polymerization in the presence of a certain peroxide catalyst, such as benzoyl peroxide. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, by removal from exposure to ultraviolet light, by adding inhibiting materials such as pyrogallol, hydroquinone, aniline, phenylene diamine, or sulphur or by destruction of the polymerization catalyst. The fusible polymer may be separated from all or part of the monomer by any of several methods. It may be precipitated by the addition of nonsolvents for the fusible polymer such as water, ethyl alcohol, methyl alcohol or glycol. Alternatively, it may also be separated from the monomer by distillation in the presence of an inhibitor for polymerization, and preferably, at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of substantial quantities, for example, 2–5 percent of benzoyl peroxide until the viscosity of the solution has increased about 100 to 500 percent. This may require from one-half to two hours while heating at 65–85° C. in the presence of benzoyl peroxide. The resulting viscous solution is poured into an equal volume of water, methyl or ethyl alcohols, glycol or other nonsolvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc. and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide generally in a heated mold. The polymers may be mixed with fillers such as alpha cellulose, wood pulp, and other fibrous substances, mineral fillers, or pigments such as zinc oxide, or calcium carbonate, lead chromate, magnesium carbonate, calcium silicate, etc.; plasticizers, such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichlorethyl ether, dibutyl phthalate, or mixtures thereof, is useful as a liquid coating composition. Objects of paper, metal, wood, cloth, leather, or synthetic resins may be coated with the solution of polymer in solvent and subsequently polymerized to yield attractively finished coatings. Similarly porous objects of felt, cloth, leather, paper, etc., either in single layers or laminated, may be impregnated with the dissolved fusible polymer and subjected to the polymerization to the final insoluble infusible state.

The following examples are illustrative:

Example I 44 grams of polyvinyl alcohol was dissolved by heating with about 10 times its weight of pyridine for 16 hours at 85° C. The solution was cooled to about 0° C. and mixed with an excess (180 grams) of cold allyl chloroformate while maintaining the temperature at 5 to 7° C. The mixture was stirred, warmed to 40° C. and poured into water slightly acidified with hydrochloric acid. A white sticky gum was precipitated. This gum was dissolved in acetone and reprecipitated with water from the acetone solution, a tough white polymer being obtained. This product cured to an infusible insoluble state upon heating with 5 percent benzoyl peroxide.

Example II

Phosgene was bubbled into a flask containing allyl alcohol at a rate of 20 millimoles per minute while agitating the mixture and cooling to a temperature below about 15 to 20° C. After phosgene in the proportion of about 0.9 mole of phosgene per mole of allyl alcohol had been introduced, the mixture was allowed to stand for one hour. Thereafter, the reaction mixture was washed with water to remove unreacted allyl alcohol and dried over calcium chloride.

2.2 moles of the allyl chloroformate was prepared as above and added dropwise to a solution of one mole of ethylene glycol in 2.4 moles of pyridine while cooling the reaction mixture to a temperature of 5–10° C. After the chloroformate had been added, the mixture was allowed to stand at room temperature for about one hour. The product was diluted with water, washed with dilute HCl solution and then with sodium chloride solution until the product was neutral. Thereafter, the product was washed with water and dried over calcium chloride. The ethylene glycol bis (allyl carbonate) having a boiling point of about 118–122° C. at 1 mm., an index of refraction of about 1.4443 ($n_D^{20}$), a density of about 1.114 ($d_4^{20}$), and having the probable formula

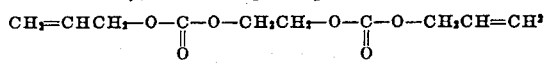

was obtained.

A quantity of the ethylene glycol bis (allyl carbonate) was dissolved in an equal weight of dioxane and 4 percent benzoyl peroxide on the basis of the weight of the monomer was introduced. The solution was heated, with stirring, at 80 to 85° C. until the viscosity had increased noticeably. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white granular solid was obtained. A quantity of this polymer was mixed with 5 percent acetone peroxide, placed in a mold and heated to 145° C. under a pressure of 2000 lbs. per square inch for 15 minutes and a transparent sheet of infusible, insoluble polymer was obtained.

Example III

Five moles (935 grams) of distilled ethylene glycol bis (chloro) formate) was added slowly to a mixture of 929 cc. of methallyl alcohol (10% excess) and 954 cc. of pyridine (20% excess). The addition was made at a rate of 1.5 moles per hour and the temperature maintained at about 5° C. After the reaction mixture had been permitted to warm to the room temperature, it was diluted with water. The ester was washed successively with 5 percent sulphuric acid, 5 percent caustic soda and water. It was decolorized with charcoal by heating at 80–100° C. while evacuating at 15 mm. to remove methallyl alcohol. 915 grams of ethylene bis (methallyl carbonate) were collected between 135 and 145° C. by distillation at a pressure of 3 mm.

The compound has the following structure:

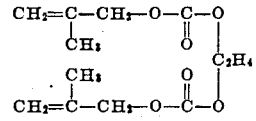

This product has a density $d_4^{20}$) of 1.103 and an index of refraction ($n_D^{20}$) of 1.4489.

A ten gram sample was mixed with 5 percent benzoyl peroxide and polymerized by heating at 80° C. for two hours. A hard, colorless, and transparent polymer was produced.

Example IV

Two moles of phthalic anhydride (296 g.) were reacted with an equivalent portion of crotyl alcohol, (114 g.) to produce the crotyl acid phthalate. This was converted to the sodium salt by adding an aqueous solution containing 50% sodium hydroxide to neutralize the product, care being taken to avoid excess NaOH. Two moles of ethylene chlorhydrin were added and the mixture heated gently for several hours. The product was freed of volatile impurities by heating at reduced pressures. The material was then mixed with 1000 cc. of carbon tetrachloride and 200 cc. of pyridine and phosgene passed in at the rate of 25–50 millimoles per minute for one hour while maintaining the temperature below 10° C. Appreciable quantities of the ester of the following structure was formed:

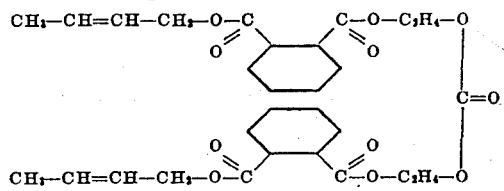

This compound was heated at 150° C. in the presence of 5 percent acetone peroxide. A hard, translucent solid was produced.

Example V 12.1 parts by weight of allyl chloroformate was slowly added to 16.4 parts by weight of castor oil in the presence of an excess of pyridine. The product was washed successively with water, dilute hydrochloric acid and then with water. Thereafter, the product was heated to 100° C. to remove volatile impurities. The product obtained was a liquid which was soluble in petroleum ether.

Example VI

Two moles of methallyl chloroformate was mixed with one mole of ethylene glycol monolactate. Thereafter, 3 moles of NaOH in the form of a 50 percent aqueous solution was slowly added with stirring, while maintaining the temperature at 0 to 5° C. The product was purified by washing with water until a neutral product was obtained and then heating under a vacuum to drive off volatile impurities. The resulting ester is a high boiling colorless liquid having the probable formula:

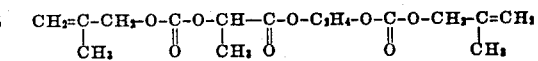

Example VII

Glyceryl trilactate was prepared by reaction of glycerol with 3 moles of lactic acid (270 g.) followed by distillation of the ester. 3 moles of allyl chloroformate and 4 moles of pyridine were added slowly over a period of and ½ hours while maintaining the temperature between 0 and 15° C. Throughout the reaction the mixture was agitated by mechanical means. The product was washed with dilute acid solution and then with water and dried over sodium sulphate. Its molecular constitution was believed to be:

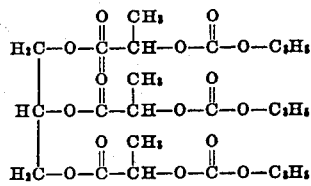

the compound polymerized readily to a hard, translucent solid.

Example VIII 365 parts by weight of allyl chloroformate was added over a period of 2 and ½ hours to 357 parts by weight of allyl lactate dispersed in 268 cc. of pyridine with stirring and at a temperature of 2 to 18° C. The reaction mixture was acidified to the methyl orange endpoint, washed with water, dilute hydrochloric acid, dilute aqueous sodium carbonate solution, again with water, and was finally dried over anhydrous sodium carbonate. The product was thereafter purified by distillation. This product boiled at about 122° C. at a pressure of 2 mm. of mercury and had a refractive index ($n_D^{20}$) of about 1.438 and a density ($d_4^{20}$) of about 1.064. The molecular structure of this compound is:

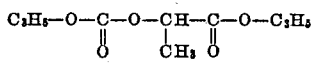

Example IX 50 grams of phosgene were passed into a stirred mixture of 190 g. of allyl salicylate, 100 g. of pyridine, and 400 g. of benzene, while maintaining the temperature below 10° C. The reaction mixture was diluted with water, and the oily layer washed successively with water, dilute hydrochloric acid, and finally with water. Benzene and volatile impurities were removed by evacuation at 200 mm. pressure while heating at 100° C. The product crystallized on cooling: the ester was washed with water and recrystallized from alcohol. It possessed a melting point of 51–53° C. The product was the carbonate diester of allyl salicylate. Its structure was as follows:

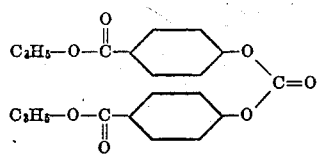

Example X

Phosgene was bubbled into a flask containing a solution containing 1690 grams of allyl lactate per liter of pyridine at a rate of 20 millimoles per minute while agitating the mixture and cooling to a temperature below about 15 to 20° C. After phosgene in the proportion of about 0.5 mole of phosgene per mole of allyl lactate had been introduced, the mixture was allowed to stand for one hour. Thereafter, the reaction mixture was acidified to the methyl orange endpoint and washed successively with equal volumes of water, dilute hydrochloric acid and dilute aqueous sodium hydroxide and finally twice with water. The product was a colorless liquid which boiled at about 154° C. at a pressure of 4 mm. of mercury and had a density of ($d_4^{20}$) of 1.22 and an index of refraction ($n_D^{20}$) of about 1.447. The molecular structure of this compound is:

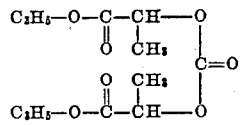

Example XI 1060 grams of 85 percent commercial lactic acid was added to 1224 grams of methallyl alcohol and the mixture heated under reflux, water being removed and methallyl alcohol being returned in accordance with the procedure of Thelin Industrial Engineering Chemistry, Analytical Edition, Vol. XIII, page 405, (1941). After 18 hours heating the mixture was fractionated, methallyl lactate, methallyl dilactate, and methallyl trilactate were secured. Approximately 233 grams of methallyl dilactate boiling at 110–117° C. at 2 mm. was secured.

One mole of methallyl dilactate and one mole of allyl chloroformate were mixed and the mixture cooled to 0° C. One and one-third moles of NaOH (54 grams) in 100 cc. of water was added dropwise over a period of one hour to the mixture, during which time the reaction temperature was maintained between 0° C. and 10° C. The resulting ester was a colorless liquid having the following probable structure:

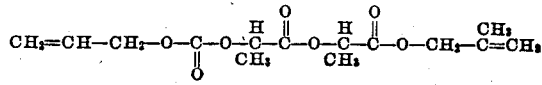

A sample was polymerized to a hard brittle solid when heated with 3 percent benzoyl peroxide for one hour at a temperature of 90° C.

Example XII

One mole of allyl lactate (130 gms.) was treated with phosgene at a temperature between $+10$ and $+30°$ C. maintained by an ice bath until approximately one mole of phosgene has been introduced. In about one hour the reaction was substantially complete. The resulting chloroformate of allyl lactate was mixed with approximately one-half a molecular equivalent of diethylene glycol (50 grams) and 100 grams of sodium hydroxide in a 50 percent water solution was slowly added to the mixture with stirring while maintaining the temperature at 0–5° C. The resulting ester was separated from the water layer and purified by washing with water and heating in vacuum to vaporize the more volatile constituents. The ester has the following formula:

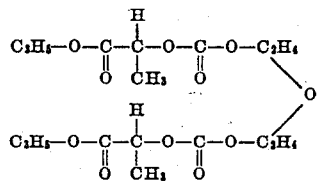

It was polymerized by heating to 150° C., in the presence of 15 percent acetone peroxide.

Example XIII

To a mixture of one mole of allyl glycerate 2.5 moles of pyridine and one-half liter of benzene was added two moles of allyl succinyl chloride while maintaining the temperature at 0 to 10° C. by stirring and cooling the mixture. The product was washed with dilute aqueous HCl solution, then with dilute sodium carbonate solution and finally with water to remove water soluble products. The mixture was then heated under a partial vacuum to drive off the benzene and the resulting ester was dried over sodium sulphate. The product has the following probable structure:

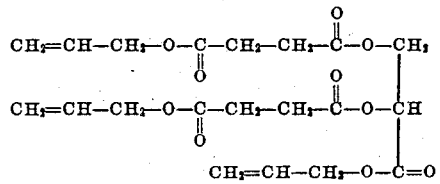

The ester polymerized upon heating at 150° C. in the presence of one percent acetone peroxide.

Example XIV 75 gms. of tartaric acid were treated with ethylene oxide at a temperature maintained between 40 and 60° C. by artificial cooling. When an equimolar quantity of ethylene oxide had been absorbed, a second portion of ethylene oxide was added while the temperature was maintained below 80° C. The resulting liquid consisted chiefly of bis (2-hydroxyethyl) tartrate. Four moles of allyl chloroformate were then added and about six moles of NaOH added over a period of one and one-half hours while maintaining the temperature between 0 and 20° C. by means of an ice bath. The complex ester formed was purified by washing with water and was treated to remove volatile impurities by heating in a vacuum. The composition was believed to be:

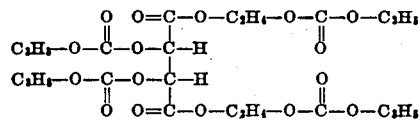

Example XV

A 75 gram sample of ethylene glycol bis chloroformate was mixed with 150% excess of methallyl alcohol over the stoichiometric amount and with 150% excess of finely divided calcium carbonate in a three-necked flask equipped with stirrer and reflux condenser. The mixture was heated for 13 minutes between 85–120° C. and subsequently for 75 minutes between 120 and 125° C. The product was washed with very dilute hydrochloric acid and heated to 115° C. while passing a stream of $CO_2$ through the mixture. This procedure caused the separation of the unreacted methallyl alcohol. This mixture was then distilled under vacuum at a total pressure of 2 mm. 70.4 grams of ethylene glycol bis (methallyl carbonate) was collected between 138 and 144° C.

Example XVI

The process of Example XV was repeated using methallyl lactate in lieu of methallyl alcohol, a colorless polymerizable high boiling liquid having the probable formula

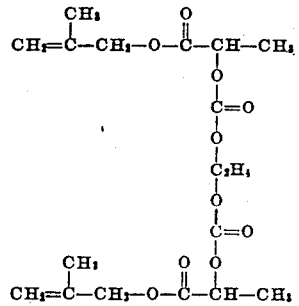

was secured.

Example XVII

A solution of 200 gms. of diallyl tartrate in benzene was reacted with 135 gms. of allyl chloroformate using the procedure described in Example IX. An ester of the following structure was prepared:

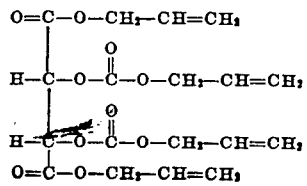

Example XVIII

The procedure of Example IX was used to react one mole of allyl glycerate with two moles of methallyl chloroformate. The following ester was prepared:

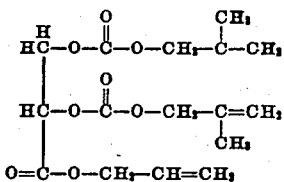

Example XIX

The procedure of Example IX was used to react dimethallyl tartrate and methallyl chloroformate in benzene solution. The following ester was produced:

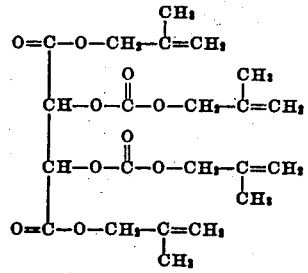

The following table sets forth approximate densities and refractive indices of other compounds of this type.

|  | Density | Refractive index $N_D^{30}$ |
|---|---|---|
| Diethylene glycol bis (allyl carbonate) | 1.133 (20° C.) | 1.449 |
| Diethylene glycol bis (methallyl carbonate) | 1.114 (20° C.) | 1.453 |
| Triethylene glycol bis (allyl carbonate) | 1.135 (20° C.) | 1.452 |
| Tetraethylene glycol bis (allyl carbonate) | 1.133 (25° C.) | 1.454 |

Although the present invention has been described with reference to the specific details of certain embodiments thereof, it is not intended that such details shall be regarded as limitations upon the scope of the invention except insofar as included in the accompanying claims:

We claim:

1. A monomeric neutral ester of (a) dimethallyl tartrate and (b) methallyl acid carbonate.

2. A monomeric neutral ester of (a) allyl glycerate and (b) methallyl acid carbonate.

3. A monomeric neutral ester of (a) diallyl tartrate and (b) allyl acid carbonate.

4. A monomeric neutral ester of (a) an ester containing at least two hydroxyl groups and (b) an acid ester of carbonic acid and a monohydroxy alcohol containing three to ten carbon atoms and an unsaturated linkage in an aliphatic straight chain.

5. The polymer of the compound described in claim 1.

6. The polymer of the compound described in claim 2.

7. The polymer of the compound described in claim 3.

8. A monomeric neutral ester of (a) an acid ester of carbonic acid and a monohydroxy alcohol having three to ten carbon atoms and an unsaturated linkage in an aliphatic chain and (b)

a hydroxy ester of an aliphatic polyhydroxy carboxylic acid.

9. As a new compound, a monomeric neutral ester of (a) a monohydroxy alcohol containing from three to ten carbon atoms and having an unsaturated carbon to carbon bond in an aliphatic carbon chain, said bond being between the second and third carbon atoms from the hydroxyl group therein and (b) a polyester containing at least one carboxylic acid group, said monomeric neutral ester containing from three to ten ester linkages at least two of which are derived from carbonic acid.

IRVING E. MUSKAT.
FRANKLIN STRAIN.